(12) United States Patent
Niaz et al.

(10) Patent No.: US 9,651,012 B2
(45) Date of Patent: May 16, 2017

(54) INJECTOR MOUNT

(71) Applicant: Perkins Engines Company Limited, Peterborough, Cambridgeshire (GB)

(72) Inventors: Naseer Niaz, Peterborough (GB); Andrew Keen, Peterborough (GB); Iuliana Mocanu, Peterborough (GB)

(73) Assignee: Perkins Engines Company Limited, Peterborough (GB)

( * ) Notice: Subject to any disclaimer, the term of this patent is extended or adjusted under 35 U.S.C. 154(b) by 0 days.

(21) Appl. No.: 14/644,727

(22) Filed: Mar. 11, 2015

(65) Prior Publication Data

US 2015/0285200 A1 Oct. 8, 2015

(30) Foreign Application Priority Data

Apr. 2, 2014 (GB) .................................. 1405960.4

(51) Int. Cl.
| | |
|---|---|
| *F02M 61/14* | (2006.01) |
| *F01N 3/10* | (2006.01) |
| *F01N 3/20* | (2006.01) |
| *F01N 3/021* | (2006.01) |
| *F01N 13/00* | (2010.01) |

(52) U.S. Cl.
CPC .............. *F02M 61/14* (2013.01); *F01N 3/021* (2013.01); *F01N 3/106* (2013.01); *F01N 3/2066* (2013.01); *F01N 13/009* (2014.06); *F01N 2610/02* (2013.01); *F01N 2610/1453* (2013.01); *Y02T 10/24* (2013.01)

(58) Field of Classification Search
CPC ................. F02M 61/14; F02M 61/168; F02M 2200/856–2200/858; F01N 3/009; F01N 3/021; F01N 3/106; F01N 3/2066; Y02T 10/24

USPC .................................................. 123/467–470
See application file for complete search history.

(56) References Cited

U.S. PATENT DOCUMENTS

| | | | |
|---|---|---|---|
| 6,302,088 B1 * | 10/2001 | Kato .................... | F02M 35/167 123/468 |
| 6,470,672 B1 * | 10/2002 | Buggele .................... | F02K 7/18 239/434 |
| 2009/0158717 A1 | 6/2009 | Kimura et al. | |
| 2013/0219871 A1 * | 8/2013 | Crandell ............... | F01N 3/2066 60/295 |

FOREIGN PATENT DOCUMENTS

WO WO 2013/130386 A1 9/2013

OTHER PUBLICATIONS

United Kingdom Intellectual Property Office, Search Report in United Kingdom Patent Application No. GB1405960.4, Nov. 11, 2014, 1 p.

* cited by examiner

*Primary Examiner* — John Kwon
*Assistant Examiner* — Johnny H Hoang (57) ABSTRACT

An injector mount for mounting an injector adjacent a curved fluid flow path includes an inner surface defining a boundary of the curved fluid flow path and an aperture between the inner surface and an outer surface. The aperture is configured to receive an injector. The inner surface includes a peripheral region, a central region recessed relative to the peripheral region, and an intermediate region including a convex surface that joins an inner edge of the peripheral region to an outer edge of the central region.

15 Claims, 8 Drawing Sheets

INJECTOR MOUNT

CROSS-REFERENCE TO RELATED APPLICATIONS

This patent application claims the benefit of United Kingdom Patent Application No. 1405960.4, filed Apr. 2, 2014, which is incorporated by reference.

TECHNICAL FIELD

The disclosure relates to an injector mount for mounting an injector adjacent a curved fluid flow path.

BACKGROUND OF THE DISCLOSURE

Providing a curved fluid flow path for passage of a first fluid and injecting a second fluid into the curved fluid flow path is known. Ensuring an appropriate level of mixing of the second fluid with the first fluid following injection may be desirable. It may also be desirable to arrange injection of the second fluid so as to reduce a likelihood of the second fluid collecting in the region of the injector. Avoiding collection of the second fluid in the region of the injector may reduce occurrence of solid deposits in the region of the injector that may otherwise inhibit flow of the second fluid from the injector.

Against this background there is provided an injector mount for mounting an injector adjacent a curved fluid flow path.

SUMMARY OF THE DISCLOSURE

An injector mount for mounting an injector adjacent a curved fluid flow path, the injector mount including:

an inner surface defining a boundary of the curved fluid flow path;

an aperture between the inner surface and an outer surface of the injector mount, the aperture configured to receive an injector;

wherein the inner surface comprises a central region, a peripheral region and an intermediate region;

the central region is recessed relative to the peripheral region; and the intermediate region comprises a convex surface that joins an inner edge of the peripheral region to an outer edge of the central region.

BRIEF DESCRIPTION OF THE DRAWINGS

An embodiment of the disclosure will now be described, by way of example only, with reference to the accompanying drawings in which.

DETAILED DESCRIPTION OF THE DRAWINGS

Figure 1:
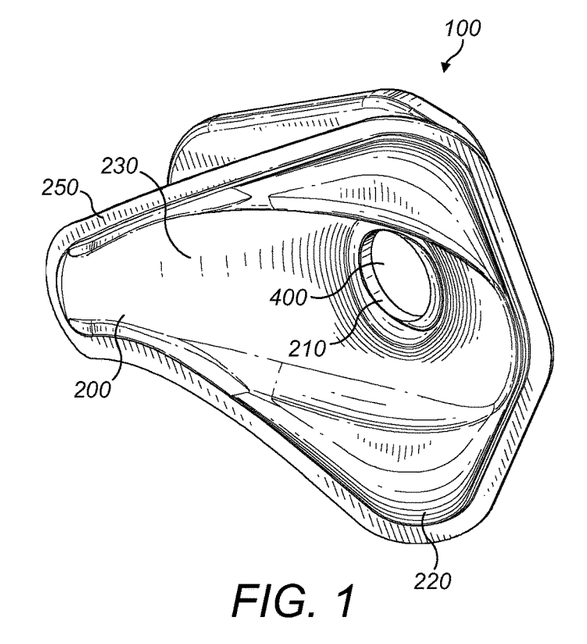
FIG. 1 shows an internal view of an injector mount in accordance with the present disclosure.
Figure 2:
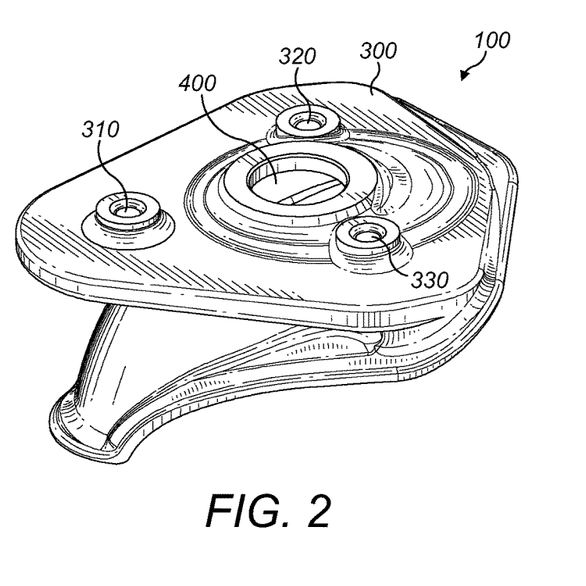
FIG. 2 shows an external view of the injector mount of FIG. 1.

An embodiment of an injector mount 100 according to the disclosure is illustrated in FIGS. 1 and 2. FIGS. 1 and 2 are shown with contour lines in an attempt to illustrate effectively the contours of the injector mount 100. Further figures that show the injector mount are not shown with contour lines but may be interpreted as including the same contours as shown in FIGS. 1 and 2.

Figure 3:
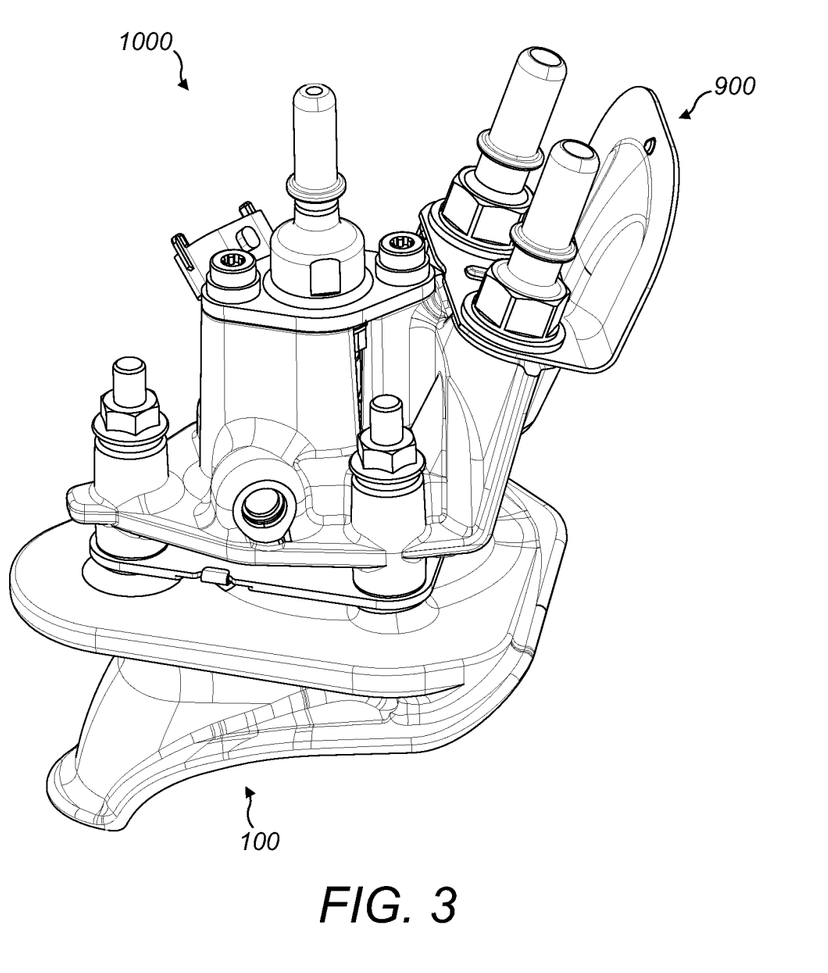
FIG. 3 shows an external view of the injector mount as shown in FIG. 2 in combination with an injector body that includes an injector.
Figure 4:
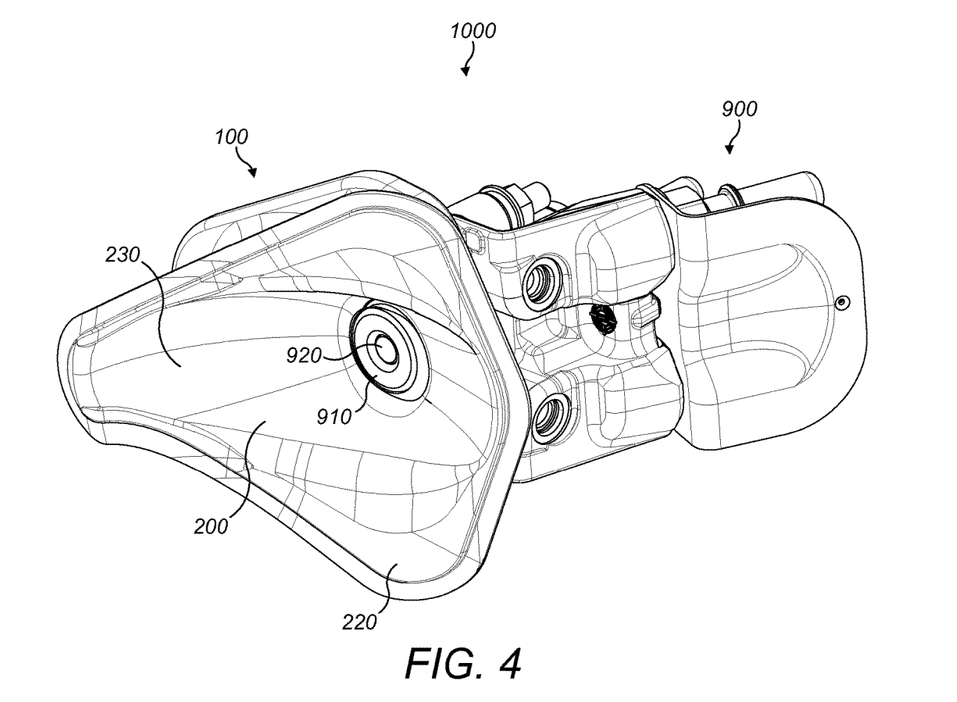
FIG. 4 shows an internal view of the injector mount as shown in FIG. 1 in combination with an injector body that includes an injector.

The injector mount 100, as illustrated in FIGS. 1 and 2, may comprise an inner surface 200 and an outer surface 300. An aperture 400 may join the inner surface 200 and the outer surface 300. The outer surface 300 may be substantially planar and include threaded bores 310, 320, 330 for receiving bolts by which an injector body 900 may be fastened to the injector mount 100. FIGS. 3 and 4 most clearly show an injector body 900 fastened to the injector mount 100 to form an injector assembly 1000. The injector body 900 may contain an internal injector (not shown). Alternatively, a single component may comprise both the injector body 900 and injector mount 100 into which an injector may be received.

The inner surface 200 of the injector mount 100 may be curved in such a way as to define at least a part of a boundary of a curved fluid flow path that may further be defined by other components of a larger system to which the injector mount 100 may be attached, in use.

Figure 5:
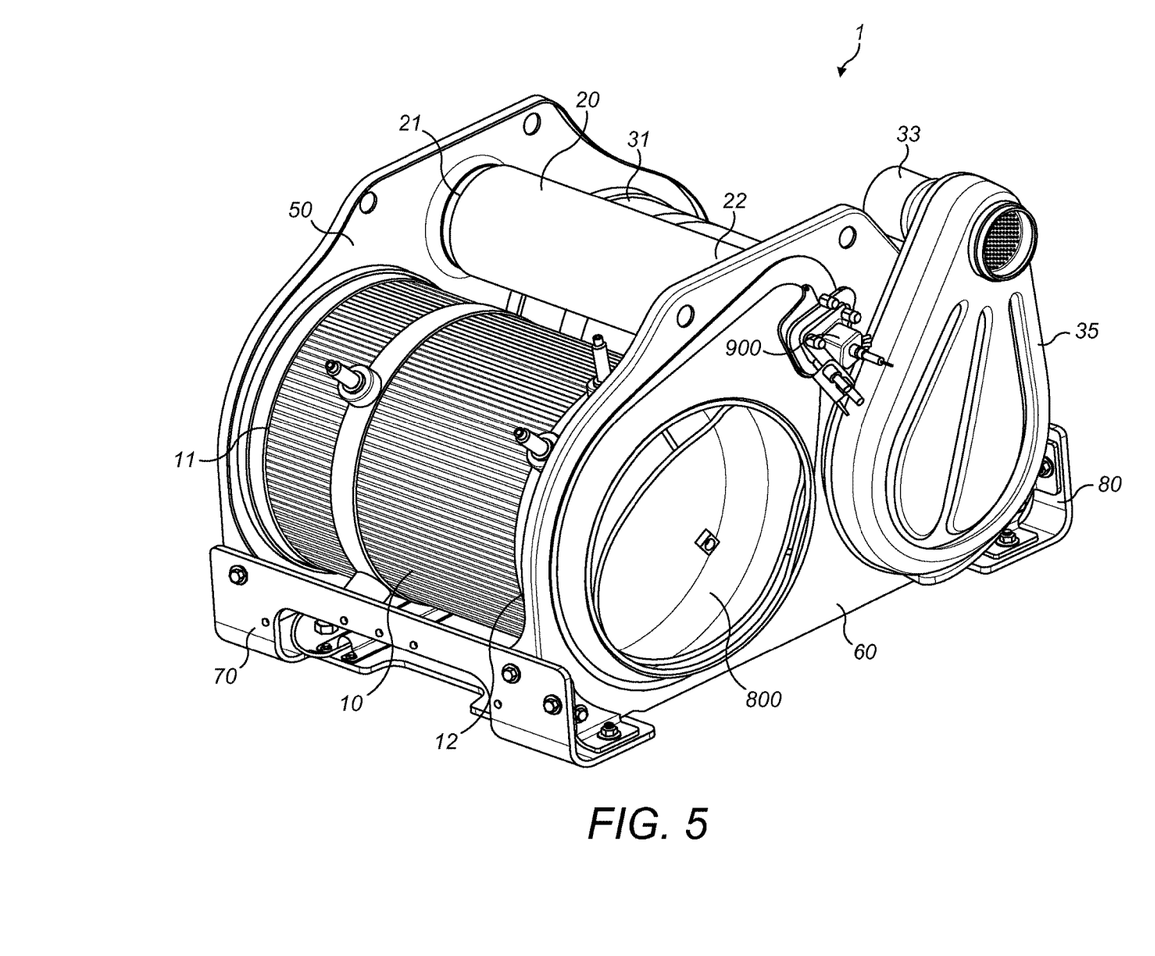
FIG. 5 shows an emissions cleaning module for use with an internal combustion engine, the emissions cleaning module including an embodiment of an injector mount in accordance with the disclosure.
Figure 6:
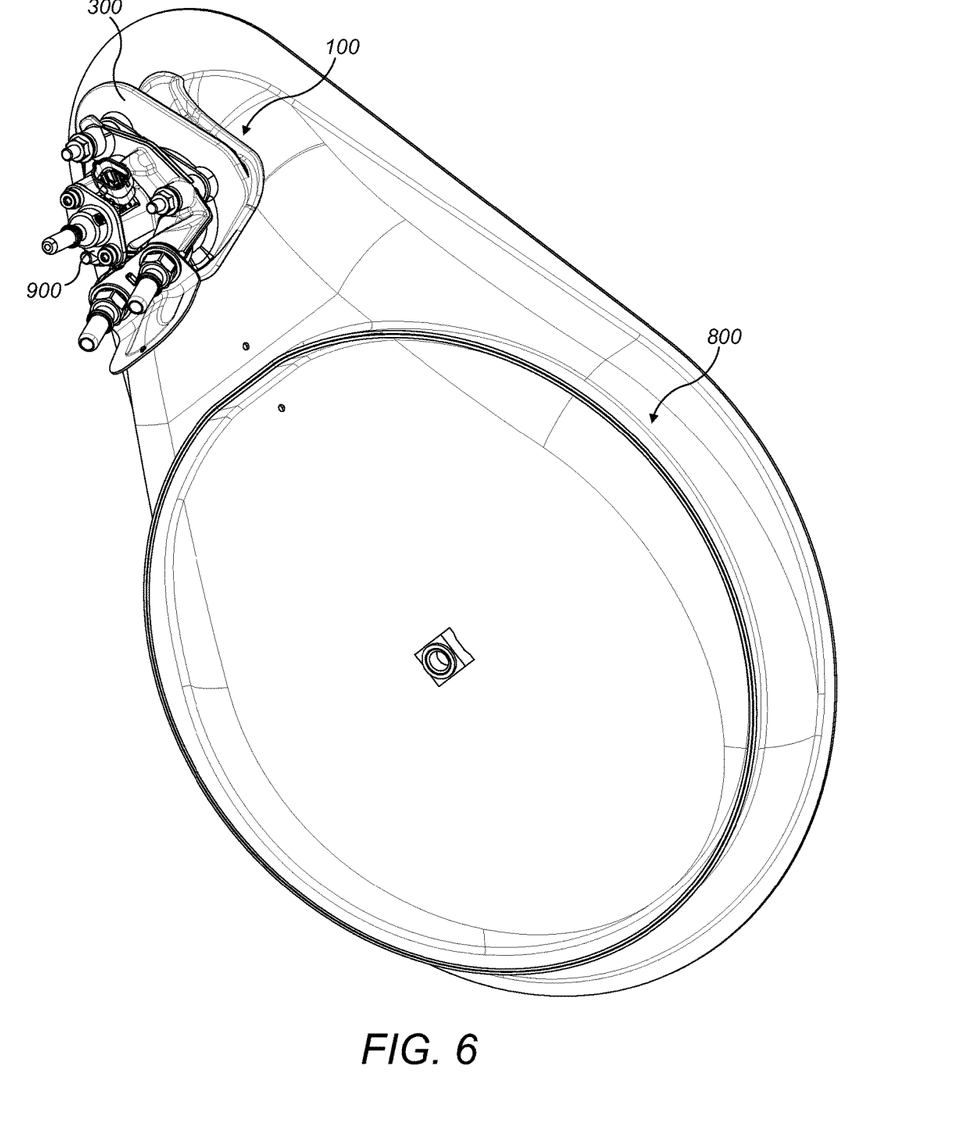
FIG. 6 shows an external view of an embodiment of an injector mount in accordance with the disclosure shown in the context of a fluid flow reversal hood and including an injector mounted in the injector mount.
Figure 7:
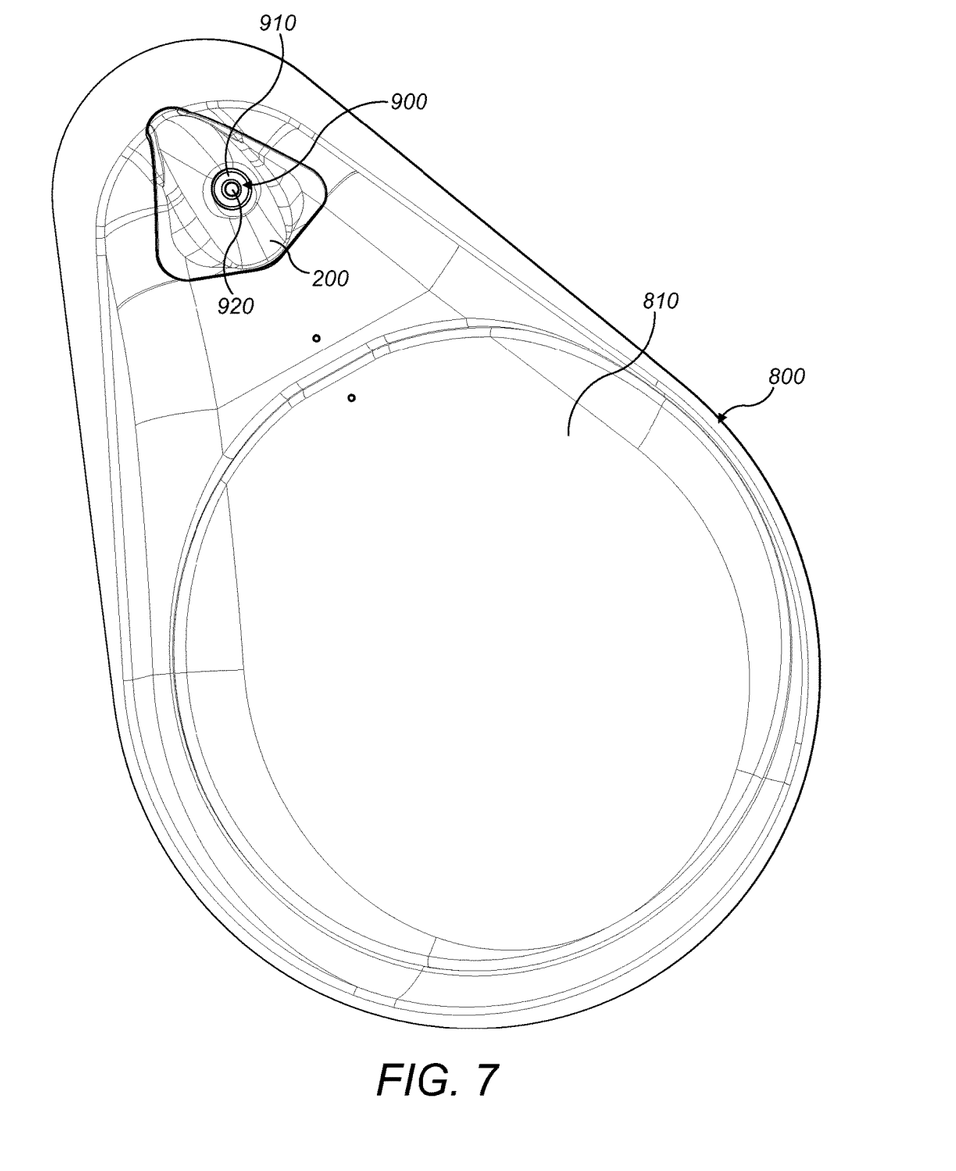
FIG. 7 shows an internal view of the arrangement of FIG. 6.

In an embodiment of the disclosure, the injector mount 100 is configured to be suitable for receipt into an opening of a flow redirecting device 800 of an emissions cleaning module 1 for an internal combustion engine. An example of an emissions cleaning module 1 is shown in FIG. 5. The flow redirecting device 800 (most clearly shown in FIGS. 6 and 7) is configured to redirect flow of fluid from a first cylindrical conduit 10 (see FIG. 5) through approximately 180° into a second cylindrical conduit 20 that is parallel to the first cylindrical conduit 10. The injector mount 100 may be located with respect to the flow redirecting device 800 such that an injection of fluid from an injector orifice 920 of an injector mounted directly, or via an injector body 900, in the injector mount 100 is directed substantially coaxially with a central axis of the second cylindrical conduit 20.

The inner surface 200 may comprise a peripheral region 220 that is concave. Specifically, the peripheral region 220 of the inner surface 200 may be selected to be concave to a similar degree to the component or components into which it is designed to be received, in use. In the embodiment of FIG. 1, the peripheral region 220 may be selected to be concave to a similar degree to an inner surface 810 of the flow redirecting device 800, as may be seen in FIG. 7.

Figure 8:
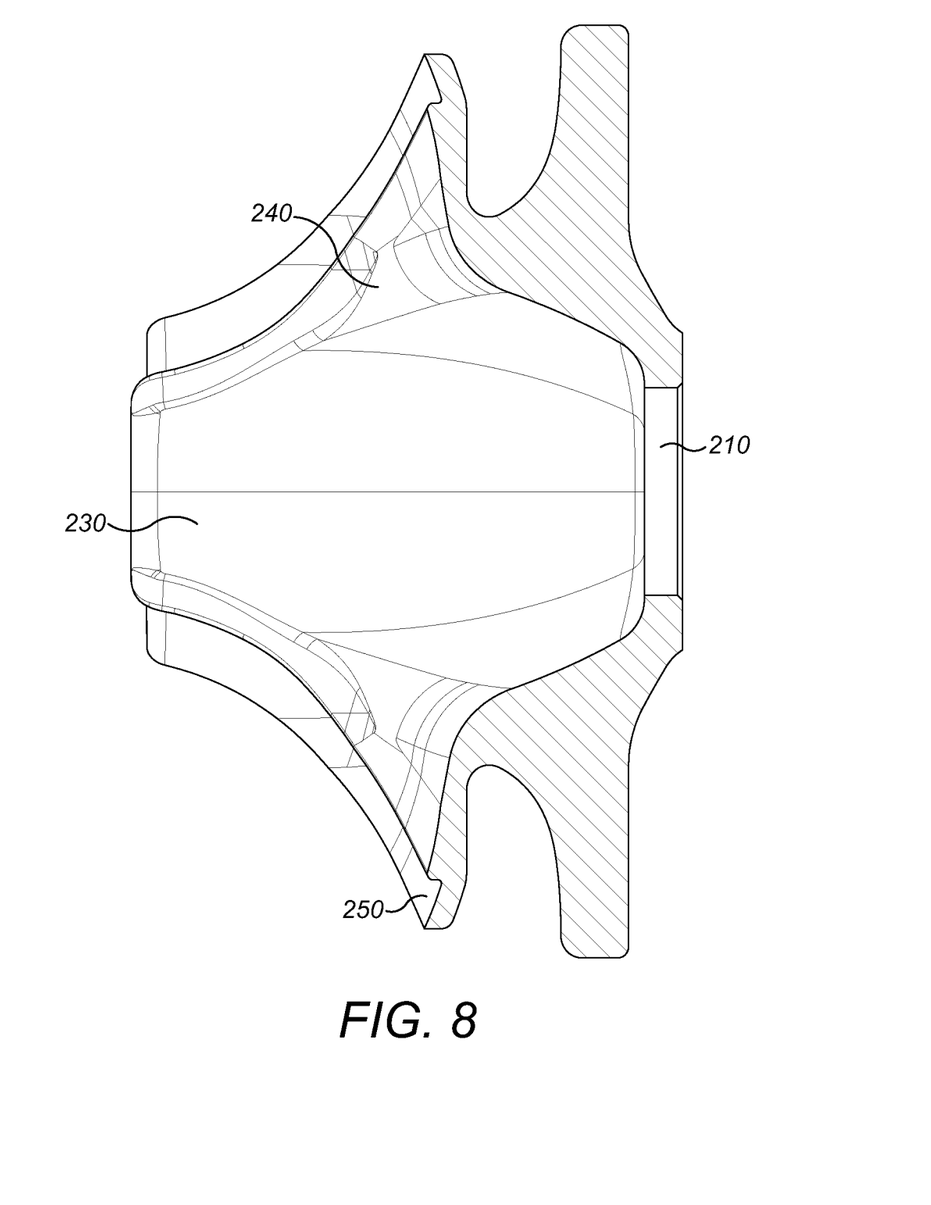
FIG. 8 shows a cross sectional view of the injector mount in isolation.
Figure 9:
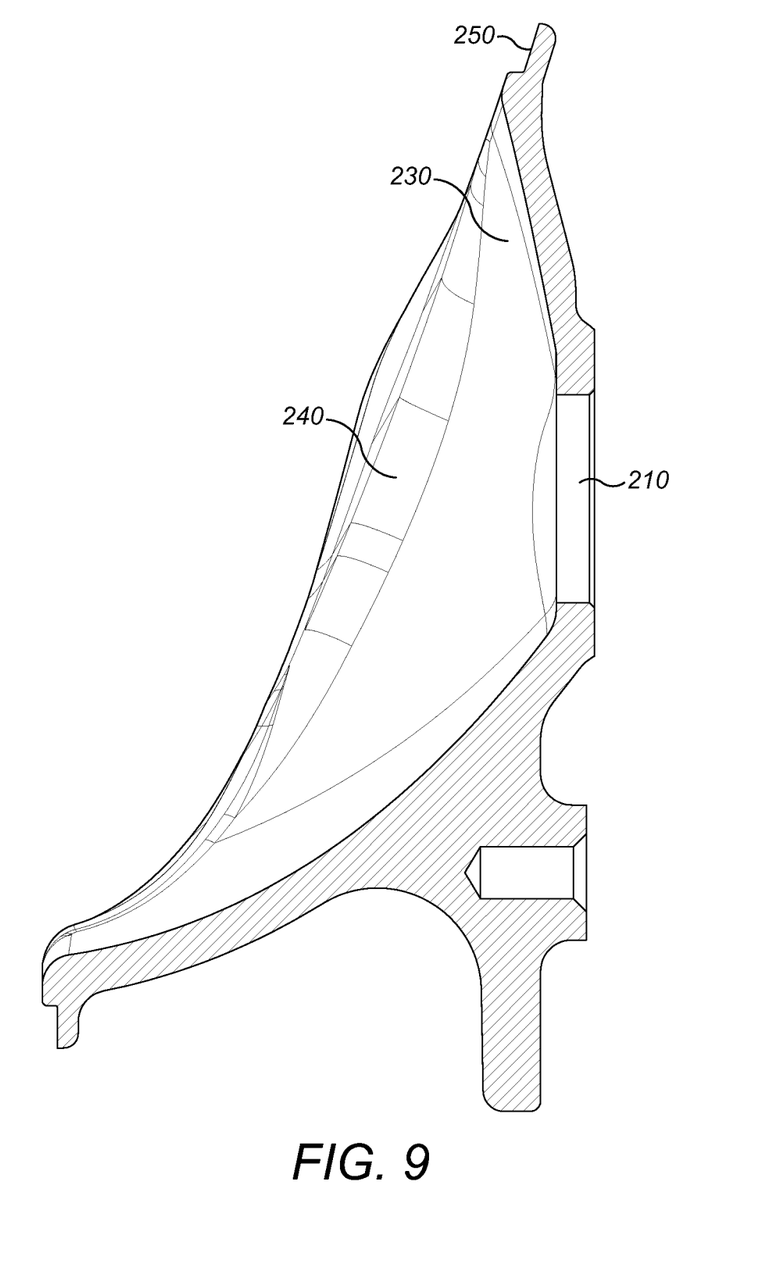
FIG. 9 shows a further cross sectional view of the injector mount in isolation.

The injector mount 100 may also comprise a flange 250 (see FIGS. 1, 8 and 9) outside the peripheral region 220 of the inner surface 200. The flange may be set back from the peripheral region 220 of the inner surface 200 by a distance equivalent to the thickness of the component into which it is designed to be received, in use. In the FIG. 1 arrangement, the flange may be set back from the peripheral region 220 of the inner surface 200 by a distance equivalent to the thickness of the flow redirecting device 800. In this way, when the injector mount 100 is placed in the opening of the flow redirecting device 800, the peripheral region 220 of the inner surface 200 forms a continuous surface profile with a region of the inner surface 810 that surrounds the opening of the flow redirecting device 800. Continuous surface profile may mean that there is no step-change in profile of the surface of the region of the inner surface 810 that surrounds the opening of the flow redirecting device 800 when it meets the peripheral region 220 of the injector mount 100. This may in turn assist in enabling fluid flowing over the inner surface 200 to flow consistently with reduced likelihood of recirculation.

The inner surface 200 may further comprise a central region 210 that is recessed relative to the peripheral region 220. The central region 210 may surround the aperture 400 such that when an injector (which may or may not be mounted in an injector body 900) is correctly received into the injector mount 100, an injector orifice 920 of the injector may sit either flush with or slightly proud of the central region 210 that surrounds the aperture 400. In this way, a flow of fluid across the inner surface 200 flows past the injector whilst avoiding recirculation. This may help to maintain a clean injector orifice 920. As shown in the specific embodiment of FIG. 4, a forward facing end of the injector may be surrounded by an annular seal 910 that surrounds an injector orifice 920 though which fluid may be injected. The injector orifice 920 may be slightly recessed with respect to the annular seal 910. Furthermore, as a further possibility for avoiding a step change in profile, the annular seal 910 may, in some embodiments, comprise a frustoconical element that protrudes from the inner surface 200.

The inner surface 200 may also comprise an intermediate region 230. The intermediate region 230 may comprise a convex surface that joins an inner edge of the peripheral region 220 to an outer edge of the central region 210. The intermediate region 230 may be convex in a plane perpendicular to the curved fluid flow path. The intermediate region 230 may be narrower than the maximum width of the injector mount 100 in order that only a narrow portion of the fluid that may be flowing in the fluid flow path may pass into the intermediate region 230 towards the central region 210 at which the injector orifice 920 may be located in the aperture 400. Furthermore, there may be a relatively small proportion of curvature in the direction of fluid flow prior to the location of the injector orifice 920, with the majority of curvature occurring downstream of the injector orifice 920. In this way, a sufficient force of fluid flow may be channelled past the injector orifice 920 in order that fluid injected out of the injector orifice 920 is entrained in the fluid flowing past the injector orifice 920.

The injector mount 100 may be of metal. It may be formed of a single casting. The inner surface 200 may have a surface roughness with a maximum value of Rz of 9.6. The inner surface may have a surface roughness with a maximum value of Ra of 2.5.

In use in an emissions cleaning module, it may be that some form of mixing device is located in the second cylindrical conduit 20 to assist further with mixing the fluid sourced from the first cylindrical conduit 10 with the fluid sourced from the injector orifice 920.

The outer surface 300 may comprise fixing means for receiving corresponding fixing means of an injector body 900 to be received by the injector mount 100. In the illustrated embodiment, the fixing means on the outer surface 300 comprise three threaded bores 310, 320, 330 that are configured to receive threaded rods and/or bolts associated with the injector body 900. The arrangement of three threaded bores 310, 320, 330 and three corresponding bolts may be asymmetrical in order to ensure that the injector body 900 can be inserted into the injector mount 100 only in the intended orientation.

In some embodiments, it may be that the central region 210 of the inner surface 200 comprises a planar annular surface. In other embodiments it may be that the central region 210 comprises a protruding frustoconical surface that surrounds the aperture. If the injector mount 100 is used in a emissions cleaning module 1 of the kind illustrated in FIG. 5, the injector mount 100 may comprise a narrowing between the inlet end at which fluid is received and the outlet end through which fluid flows onward. This narrowing may be in proportion to the narrowing of the flow redirecting device 800 that links the first cylindrical conduit 10, of relatively larger diameter, to the second cylindrical conduit 20, of relatively smaller diameter.

INDUSTRIAL APPLICABILITY

The injector mount 100 of the disclosure may be applicable in a variety of applications.

The injector mount 100 may receive an injector, perhaps mounted in an injector body 900, configured to inject fluid. The injector mount 100 may be mounted in a non-linear fluid flow path of a first fluid to enable injection of a second fluid from an injector orifice 920 into a curved fluid path of the first fluid.

One application is for use in an emissions cleaning module 1 as illustrated in FIG. 5 where different emission cleaning functionality takes place in different conduits in a compactly packaged unit. The injector may be mounted at a periphery of the unit yet part-way through the total fluid flow route through the emissions cleaning module 1.

In use, exhaust fluid to be treated by the emissions cleaning module enters the emissions cleaning module at a first end 11 of the first cylindrical conduit 10. Within the first cylindrical conduit 10 there may be located a diesel oxidation catalyst (DOC) and/or a diesel particulate filter (DPF). After passing through the diesel oxidation catalyst and the diesel particulate filter, the first fluid may pass into the flow redirecting device 800 and past the injector mount 100 at which point the second fluid may be injected through the injector orifice 920.

First and second fluids may thereby pass intro the second cylindrical conduit 20 at a first end 22 of the second cylindrical conduit 20.

Within the second cylindrical conduit 20 there may be located a mixing device that is configured to mix the first fluid (e.g. exhaust fluid from an internal combustion engine) having exited from the first cylindrical conduit 10 with the second fluid (e.g. urea and/or ammonia) having been injected through the injector orifice 920.

At a second end 21 of the second cylindrical conduit 20, fluid may pass through a further fluid flow redirection device into a first end 31 of a third cylindrical conduit 30. Within the third cylindrical conduit 30 there may be located a selective reduction catalyst and an AMOX module for treatment of the combined fluid. At a second end of the third cylindrical conduit 30, opposite the first end 31, fluid may pass out through a third fluid redirection device 35 to a final outlet 33 at which point the fluid may be vented to atmosphere or to further fluid treatment.

Incomplete mixing of the second fluid with the first fluid may adversely affect chemical processes intended to occur in the device. Where the second fluid is urea, for example, inadequate mixing of the urea with the first fluid (e.g. exhaust gas) may result in inadequate decomposition of the urea to ammonia. Inadequate decomposition into urea may result in a build-up of solid urea deposit on the internal surfaces of the device, including the injector mount 100. The location and nature of the injector mount 100, together with the configuration of the injector mount 100 for receiving an injector that may be housed in an injector body 900, may increase the consistency of flow of exhaust fluid in the vicinity of the injector orifice 920 that may in turn assist in keeping the injector orifice 920 clean. This may have a positive impact upon performance.

We claim:

1. An injector assembly comprising:
   an injector body including an injector; and
   an injector mount for mounting the injector adjacent a curved fluid flow path, the injector mount comprising:
   an inner surface defining a boundary of the curved fluid flow path;
   an aperture between the inner surface and an outer surface of the injector mount, the aperture configured to receive an injector;
   wherein the inner surface comprises a central region, a peripheral region and an intermediate region;
   the central region is recessed relative to the peripheral region;
   the intermediate region comprises a convex surface that joins an inner edge of the peripheral region to an outer edge of the central region;
   wherein the injector body is received in the aperture of the injector mount such that a forward face of the injector is flush with or proud of the inner surface of the injector mount whereby a flow of fluid across the inner surface flows past the injector whilst avoiding recirculation.

2. The injector assembly of claim 1 wherein the central region comprises at least one of a planar annular surface and a protruding frustoconical surface that surrounds the aperture.

3. The injector assembly of claim 1 wherein the convex surface of the intermediate region is convex in a plane parallel to the curved fluid flow path.

4. The injector assembly of claim 1 wherein the convex surface of the intermediate region is convex in a plane perpendicular to the curved fluid flow path.

5. The injector assembly of claim 4 wherein the convex surface of the intermediate region is convex in a plane parallel to the curved fluid flow path, wherein the convex surface is more convex in the plane perpendicular to the curved fluid flow path than in the plane parallel to the curved fluid flow path.

6. The injector assembly of claim 1 wherein the peripheral region comprises a peripheral convex surface.

7. The injector assembly of claim 6 wherein the peripheral convex surface is less convex than the convex surface of the intermediate region.

8. The injector assembly of claim 1 wherein the outer surface comprises a threaded bore for receiving fastening features of an injector suitable for receipt into the aperture.

9. The injector assembly of claim 8 wherein the mounting boss is asymmetrical in at least one plane in order to ensure an injector can be received in only one orientation.

10. The injector assembly of claim 1, formed of metal of a single casting.

11. The injector assembly of claim 1 wherein the central region of the injector mount includes a planar annular surface that surrounds the aperture, and wherein the forward face of the injector is substantially planar and sits in a plane of the planar annular surface that surrounds the aperture.

12. The injector assembly of claim 2 wherein the convex surface of the intermediate region is convex in a plane parallel to the curved fluid flow path.

13. The injector assembly of claim 2 wherein the convex surface of the intermediate region is convex in a plane perpendicular to the curved fluid flow path.

14. The injector assembly of claim 2 wherein the peripheral region comprises a peripheral convex surface.

15. The injector assembly of claim 4 wherein the peripheral region comprises a peripheral convex surface.

* * * * *